(12) United States Patent
Hewitt et al.

(10) Patent No.: US 10,834,034 B2
(45) Date of Patent: Nov. 10, 2020

(54) COGNITIVELY GENERATING USER GROUP USING OPTIMAL MESSAGING QUEUE LENGTHS FOR COLLABORATIVE MESSAGING PLATFORMS

(71) Applicant: International Business Machines Corporation, Armonk, NY (US)

(72) Inventors: Trudy L. Hewitt, Cary, NC (US); Jeremy R. Fox, Georgetown, TX (US); Liam S. Harpur, Skerries (IE); John Kennedy, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 16/107,213

(22) Filed: Aug. 21, 2018

(65) Prior Publication Data

US 2020/0067854 A1   Feb. 27, 2020

(51) Int. Cl.
| G06F 15/16 | (2006.01) |
| H04L 12/58 | (2006.01) |
| H04L 12/18 | (2006.01) |
| H04L 29/08 | (2006.01) |

(52) U.S. Cl.
CPC ........ *H04L 51/046* (2013.01); *H04L 12/1818* (2013.01); *H04L 12/1822* (2013.01); *H04L 67/306* (2013.01)

(58) Field of Classification Search
CPC  H04L 51/046; H04L 12/1822; H04L 12/1818
See application file for complete search history.

(56) References Cited

U.S. PATENT DOCUMENTS

| 6,480,885 | B1 | 11/2002 | Olivier |
| 6,959,081 | B2 | 10/2005 | Brown et al. |
| 7,359,498 | B2* | 4/2008 | Faber ...................... H04M 3/42 |
| | | | 379/209.01 |
| 2004/0186766 | A1* | 9/2004 | Fellenstein .......... G06Q 10/107 |
| | | | 705/14.56 |
| 2006/0020529 | A1* | 1/2006 | Chao ...................... G06Q 10/00 |
| | | | 705/35 |
| 2006/0057079 | A1 | 3/2006 | Pickover |
| 2006/0165040 | A1* | 7/2006 | Rathod .................. G06Q 10/10 |
| | | | 370/335 |
| 2007/0016585 | A1* | 1/2007 | Nickell ................. G06F 16/951 |
| 2007/0273755 | A1* | 11/2007 | Yang ................... H04L 12/1822 |
| | | | 348/14.08 |
| 2010/0070554 | A1 | 3/2010 | Richardson et al. |
| 2012/0079021 | A1* | 3/2012 | Roman ............... H04L 12/6418 |
| | | | 709/204 |

(Continued)

*Primary Examiner* — Richard G Keehn
(74) *Attorney, Agent, or Firm* — Garg Law Firm, PLLC; Rakesh Garg; Michael O'Keefe (57) ABSTRACT

Determining a group of participants for a collaborative messaging session includes receiving a user message containing a request for information, determining one or more keywords associated with the user message, and determining a group for the collaborative messaging session. A queue length for the group is determined, and one or more candidates is determined based on the one or more candidates being associated with the one or more keywords in which a number of the one or more candidates based upon the queue length. An invitation is transmitted to each candidate to join the collaborative messaging session.

20 Claims, 5 Drawing Sheets

(56) References Cited

U.S. PATENT DOCUMENTS

| | | | |
|---|---|---|---|
| 2014/0365327 A1* | 12/2014 | Crossan | G06Q 30/08 |
| | | | 705/26.4 |
| 2017/0364802 A1 | 12/2017 | Gordon et al. | |
| 2019/0253517 A1* | 8/2019 | Ciano | H04L 67/32 |
| 2019/0385595 A1* | 12/2019 | Wabgaonkar | G06N 3/0445 |

* cited by examiner

COGNITIVELY GENERATING USER GROUP USING OPTIMAL MESSAGING QUEUE LENGTHS FOR COLLABORATIVE MESSAGING PLATFORMS

TECHNICAL FIELD

The present invention relates generally to a method, system, and computer program product for collaborative messaging. More particularly, the present invention relates to a method, system, and computer program product for cognitively generating a user group using optimal messaging queue lengths for collaborative messaging platforms.

BACKGROUND

Collaboration tools, such as collaborative messaging applications, allow users to collaborate with one another to accomplish common goals or objectives. Many collaboration tools allow members of a group to have real-time discussions with one another. Collaboration tools such as group chatting systems are becoming increasingly popular for both work and non-work related activities. Collaboration tools are often used among various organizations to allow co-workers to collaborate with one another as well as for customer support. For example, a customer of a business may ask a question regarding a product using the collaboration tool and an employee of the business, such as a customer support person, may provide an answer to the question. Accordingly, chatting programs and other collaboration tools have become an essential component of the daily jobs for members of many organizations.

SUMMARY

The illustrative embodiments provide a method, system, and computer program product. An embodiment of a method for determining a group of participants for a collaborative messaging session includes receiving a user message containing a request for information, determining one or more keywords associated with the user message, and determining a group for the collaborative messaging session. The embodiment further includes determining a queue length for the group, determining one or more candidates based on the one or more candidates being associated with the one or more keywords in which a number of the one or more candidates based upon the queue length. The embodiment further includes transmitting an invitation to each candidate to join the collaborative messaging session.

Another embodiment further includes adding at least one of the one or more candidates to the collaborative messaging session. Another embodiment further includes determining a wait time for the group, and determining that the wait time for the group has been exceeded. In the embodiment, the adding of the at least one of the one or more candidates to the collaborative messaging session is responsive to the wait time for the group being exceeded.

In another embodiment, the group is determined based upon the one or more keywords. In another embodiment, the one or more candidates are determined based upon a profile of the candidate. In another embodiment, the profile includes the one or more keywords being associated with a profile of the candidate.

In another embodiment, the profile further includes at least one of information indicating activity of the candidate in the group, information indicating an amount that the candidate has assisted previously in providing information associated with the one or more keywords, information indicating activity of the candidate in other groups associated with the one or more keywords, and information indicating general activity of the candidate on a collaborative messaging platform including the collaborative messaging session.

In another embodiment, the queue length is determined based upon a statistical likelihood of the requested information being provided during the collaborative messaging session.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments described herein are directed to cognitively generating user groups using optimal messaging queue lengths for collaborative messaging platforms. While chatting platforms and other collaborative messaging platforms are loved by many of their users, one of the outstanding problems of these platforms is that there is great scope for self-help. For example, a company/organization may become aware of a situation affecting many users simultaneously such as a service outage during a heavy storm. Such situations may occur when resources, such as terms of technical staff online to deal with customer queries, may be very limited or overburdened.

In another example, a customer having an urgent issue and needing immediate help enters a chat channel of a collaborative messaging platform. In the example, the customer sends a message to a channel with a message of "how do I get an integration key?". In the example, the channel is very large with over three thousand members. As a result, a large number of unnecessary messages to all active users within the channel.

In another example, upon the entry of a first subscriber to a help section of a website having a chat window available, the involved users connected to the website may be caught up in a related scenario. However, the support staff often have to deal with the queue of involved people in a sub-optimal manner. One or more embodiments recognize that a clear need exists for optimized group handling for the collaboration tools such as chatting programs to improve user productivity and efficiency, especially when the group has a large number of members. The illustrative embodiments used to describe the invention generally address and solve the above-described problems and other problems related to cognitively generating a user group using optimal messaging queue lengths for collaborative messaging platforms.

An embodiment describes a cognitive and intelligent system for implementing collaborative messaging queues for a collaborative messaging platform in which the system deliberately does not answer a user submitted question immediately to allow a queue of involved people to build up to an optimal group size of people waiting to chat or ask a similar question. In the embodiment, once the optimal group size is reached, the participants in the queue are allowed to collaborate together using one or more specific queue methods.

In an embodiment, the system lengthens the queue if it is statistically likely that the studied participants would collaborate with each other. In an embodiment, the system calculates a benefit threshold for holding the queue to allow for a larger collective of participants to form. In particular embodiments, the benefit threshold calculation considers a number of different factors, such as, skill levels of those already participating (e.g., if a senior developer is attending, it may not be necessary to wait for a larger group to form), a type/difficulty of questions that will be asked (e.g., simple questions may not require a larger audience); a social benefit of including other users (e.g., a tolerance vs. benefit of waiting to allow other users to interact). In particular embodiments, the calculated threshold is weighted based on an individual user's tolerance level representative of a willingness of the user to wait for a collective to form.

In an embodiment, the system is configured to trigger actions to meet required thresholds, such as sending out dynamic invites, push notifications, and/or social media messages to solicit other users to participate. One or more embodiments are configured to interoperate with existing collaboration tools including, but not limiting to, chatting programs, web pages, and social media postings, to allow users to utilize a familiar interface to interact with the collaboration tools. In particular embodiments, a system administer and/or a channel administrator for a particular channel of a collaboration tool can determine whether to enable the intelligent group optimization procedures as described herein for a particular channel.

In an embodiment, when intelligent group optimization is enabled, whenever a message that is intended to notify a specified entity or a large group (e.g., using @here or @channel), the system determines the queue length based on one or more candidate selection factors to select the optimal candidates who are likely to respond. In particular embodiments, the candidate selection factors may include one or more of a topic and context of the message, a frequency of interaction of each user who is active in the channel, a skill level of a user relevant to the topic, users who have replied to similar messages in the past in the channel, a frequency of each user who likely replies within a time window that the message is going to be sent, whether a user is active using the collaboration tool currently, and/or a number of channels a user is currently actively within.

In one or more embodiments, if a preferred candidate fails to reply and/or respond within a predetermined time period, the system automatically modifies the queue length. In accordance with one or more embodiments, the system learns via modelling to pick the optimal queue length.

An embodiment may provide an advantage of maximizing user productivity and efficiency by obtaining faster help via targeted queue length optimization. Another embodiment may provide an advantage of reducing unnecessary escalations for many other members for a given subscription or channel, thus improving their productivity and focus.

In one or more embodiments, the system integrates with existing collaboration tool platforms or social media platforms such as chatting platforms or social media status update platforms. In an embodiment, a user sends a message to a collaboration tool platform including a question, and the system detects that the message is a candidate to go into either a new or existing messaging queue. If there is no reply constraint indicating that the message must be addressed within a configurable probability time window, e.g., three minutes, the system sends the message to a new/existing messaging queue to be handled according to the optimal messaging queue length determination procedures described herein.

In an embodiment, the system detects a message from a user to a collaborative messaging platform including a question for which the user desires an answer. In the embodiment, the system analyses the user message and generates one or more associated keywords from the message indicative of a topic or context of the user message. In particular embodiments, the system generates the associated keywords from the user message using one or more topic, context, and/or keyword determination techniques such as natural language processing (NLP).

In the embodiment, the system determines a group for the user message, such as a particular channel of the collaborative messaging platform, based upon the one or more keywords. In the embodiment, the system performs group optimization by determining an optimal queue length for the group. In a particular embodiment, the system may also determine additional group optimization parameters for the group. In an embodiment, the optimal queue length for the group includes the number of candidates to send to each group. In particular embodiments, the additional group optimization parameters may include one or more of a time window to wait for the queue to fill with participants and an indication of when group optimization stops. In particular embodiments, group optimization stops by one or more of the system automatically detecting the question as answered, relying on users to indicate that the question has been answered, polling the original message sender to answer whether the question has been answered, or when all possible candidates have been notified.

In the embodiment, the system selects one or more candidates for participation in the group and sends invitations to the one or more selected candidates requesting participation in the group. In particular embodiments, the system selects the one or more candidates based upon one or more of a channel profile for each candidate indicating whether the candidate has expertise in the subject matter or context indicated by the one or more keywords, how active the candidate is in the given channel and how much the candidate has helped in the past in subject matter associated with the keyword, whether the candidate is active on the collaborative messaging platform in other channels of the collaborative messaging platform regarding subject matter associated with the keyword, and the candidate's general active time on the collaborative messaging platform.

In the embodiment, the system waits for the queue to be filled with selected candidates of the optimal group length. If the queue is filled to the optimal group length, the system sends out the group length optimization with the number of users for each group and time window between each group based on the prior configuration information described above and the selected candidates to the collaborative messaging platform. In the embodiment, the collaborative messaging platform adds the selected candidates and the original message sender to a collaborative session in which the selected candidates may interact with one another to attempt to answer the question presented within the original message.

In the embodiment, the system continuously detects whether the question presented in the message has been answered. In a particular embodiment, the system allows participants to mark the question as answered and/or poll the original message sender to ensure that the question has been answered. In a case in which the message has not been answered, the system determines a next group, optimal queue length, and candidates until the question has been answered or all potential candidates have been notified.

An embodiment can be implemented as a software application. The application implementing an embodiment can be configured as a modification of an existing collaborative messaging system or platform, as a separate application that operates in conjunction with an existing collaborative messaging system or platform, a standalone application, or some combination thereof.

The illustrative embodiments are described with respect to certain types of collaboration tools and platforms, user group and optimal messaging queue length determining procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
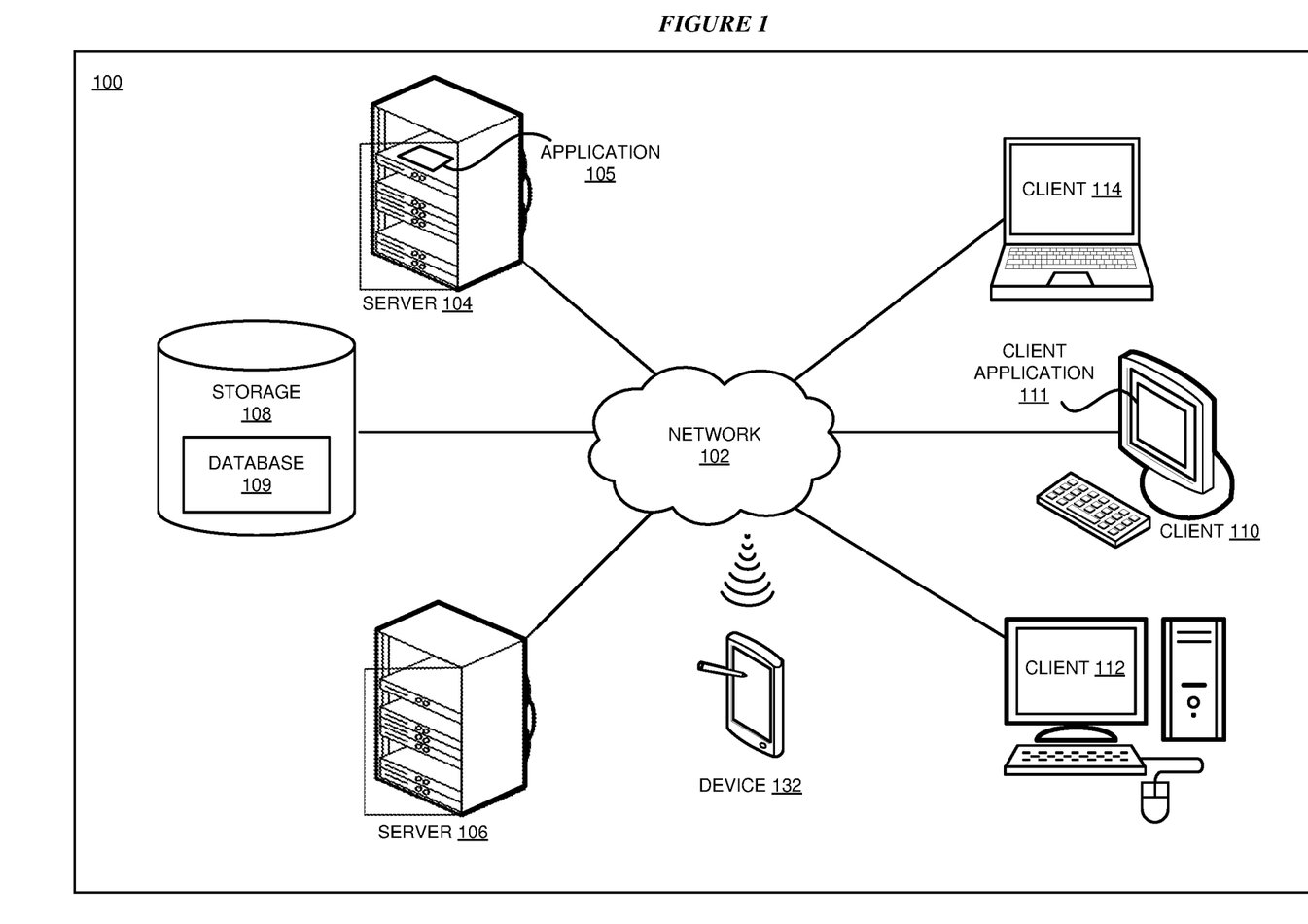
FIG. 1 depicts a block diagram of a network of data processing systems in which illustrative embodiments may be implemented.
Figure 2:
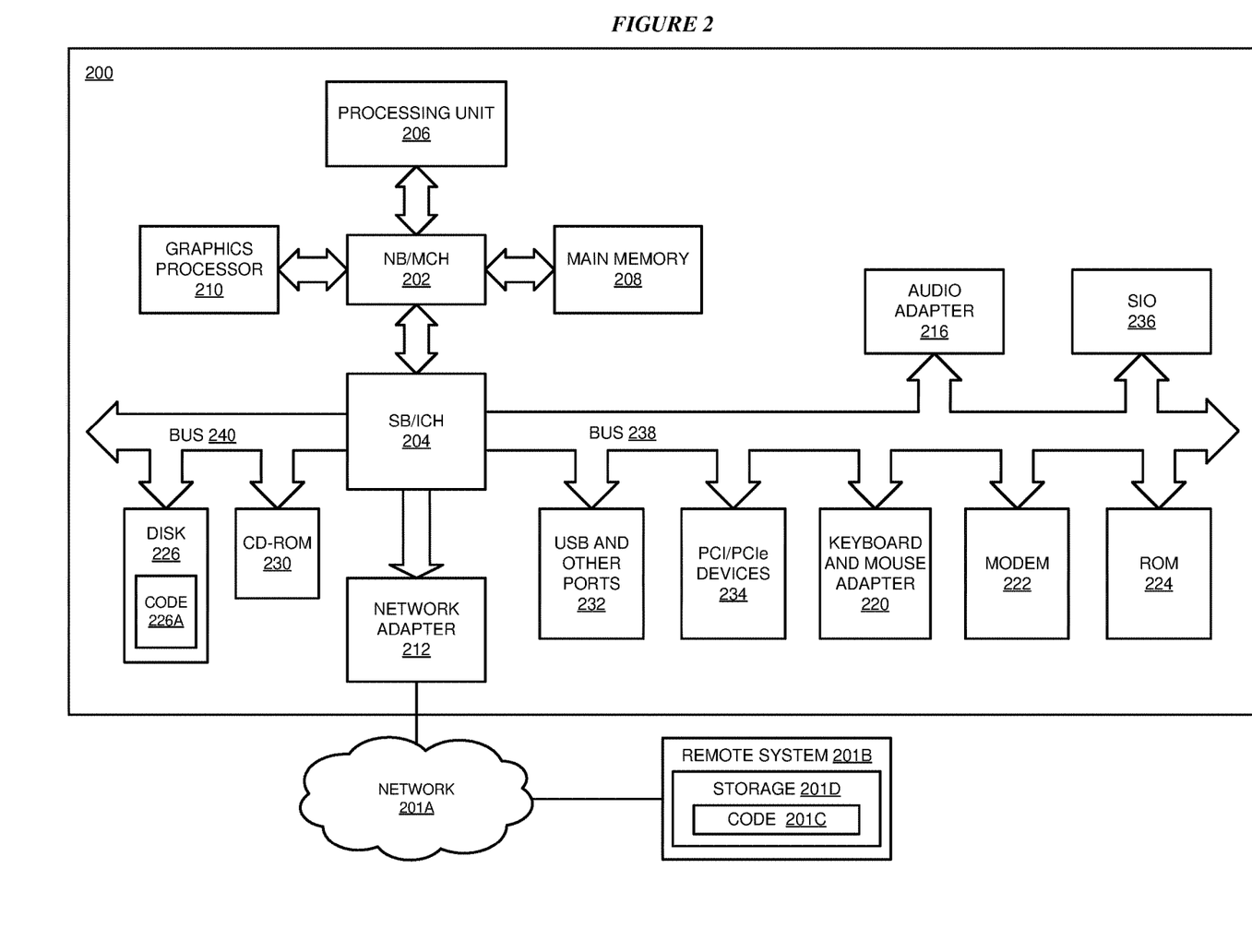
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes a client application 134 configured to perform functions of client application 134 described herein. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for cognitively generating a user group using optimal messaging queue lengths for a collaborative messaging platform in accordance with one or more embodiments.

Server 106 implements a collaborative messaging platform configured to allow users to collaborate using one or more collaborative messaging sessions as described herein with respect to various embodiments. Storage device 108 includes one or more databases 109 configured to store candidate profile information as described herein. Claim 110 includes a client application 111 configured to allow a user to participate in a collaborative messaging session as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
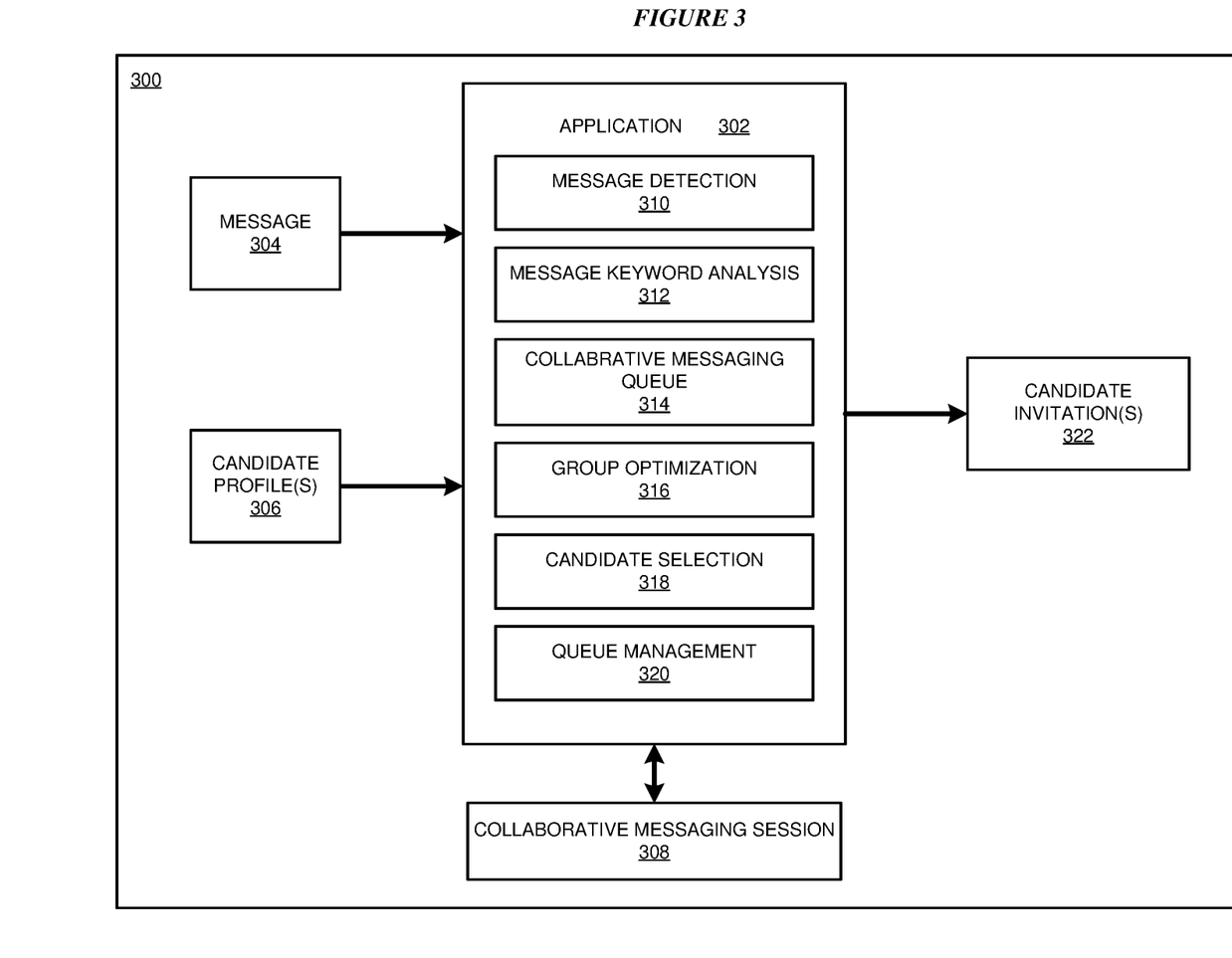
FIG. 3 depicts a block diagram of an example configuration for cognitively generating a user group using optimal messaging queue lengths for a collaborative messaging platform in accordance with an illustrative embodiment.

With reference to FIG. 3, this figure depicts a block diagram of an example configuration 300 for cognitively generating a user group using optimal messaging queue lengths for a collaborative messaging platform in accordance with an illustrative embodiment. The example embodiment includes an application 302. In a particular embodiment, application 302 is an example of application 105 of FIG. 1.

Applicant 302 receives a message 304 from a user in which the message includes a question, query or other request regarding particular subject matter conveyed in message 304. Application 302 further receives one or candidate profiles(s) 306 including profile information associated with one or more potential candidates to be placed in a messaging queue for responding to the message 304.

Application 302 includes a message detection component 310, a message keyword analysis component 312, a collaborative messaging queue 314, a group optimization component 316, a candidate selection component 318, and a queue management component 320. In the embodiment, message detection component 310 is configured to detect message 304 including a request for information (e.g., a question) from a user to a collaborative messaging platform, and message keyword analysis component 312 is configured to analyze message 304 and generates one or more associated keywords from the message indicative of a topic or context of the user message. Group optimization component 316 determines a group for the user message, such as a particular channel of the collaborative messaging platform, based upon the one or more keywords and performs group optimization on the group by determining an optimal queue length of collaborative messaging queue 314 for the group. In a particular embodiment, the optimal queue length for the group includes the number of candidates to send to each group. In one or more embodiments, group optimization component 316 is configured to determine additional group optimization parameters including one or more of a time window to wait for the queue to fill with participants and an indication of when group optimization stops. In particular embodiments, group optimization stops by one or more of the system automatically detecting the question as answered, relying on users to indicate that the question has been answered, polling the original message sender to answer whether the question has been answered, or when all possible candidates have been notified.

In the embodiment, candidate selection component 318 selects one or more candidates for participation in the group and sends one or more candidate invitations 322 to the one or more selected candidates. In an embodiment, the one or more candidate invitations 322 include a request for the selected candidate to participate in the group. In particular embodiments, the system selects the one or more candidates based upon one or more of candidate profile(s) 306 for each candidate indicating whether the candidate has knowledge and/or expertise in the subject matter or context associated with the one or more keywords, how active the candidate is in the given channel and how much the candidate has helped in the past in subject matter associated with the keyword, whether the candidate is active on the collaborative messaging platform in other channels of the collaborative messaging platform regarding subject matter associated with the keyword, and the candidate's general active time on the collaborative messaging platform.

In the embodiment, queue management component 320 waits for the queue to be filled with selected candidates of the optimal group length. If the queue is filled to the optimal group length, queue management component 320 sends out the group length optimization with the number of users for each group and time window between each group based on the prior configuration information described above and the selected candidates to the collaborative messaging platform. In the embodiment, queue management component 320 adds the selected candidates and the original message sender to collaborative messaging session 308 in which the selected candidates may interact with one another to attempt to answer the question presented within the original message.

In the embodiment, queue management component 320 continuously detects whether the question presented in the message has been answered. In a particular embodiment, the system allows participants to mark the question as answered and/or poll the original message sender to ensure that the question has been answered. In a case in which the message has not been answered, group optimization component 316 determines a next group, optimal queue length, and candidates until the question has been answered or all potential candidates have been notified.

Figure 4:
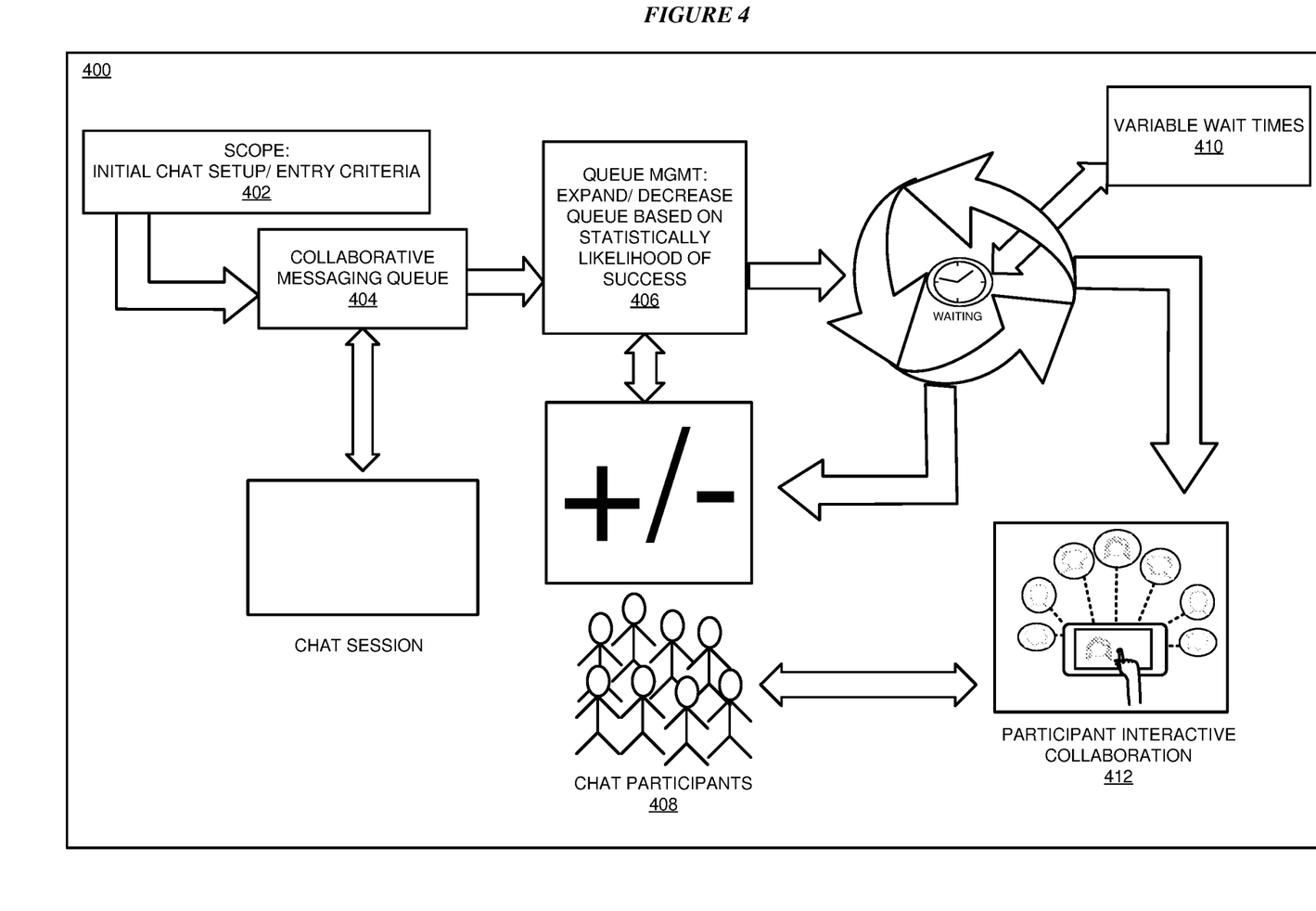
FIG. 4 depicts an example optimal messaging queue length determining sequence in accordance with an illustrative embodiment.

With reference to FIG. 4, this figure depicts an example optimal messaging queue length determining sequence 400 in accordance with an illustrative embodiment. In block 402, application 105 detects a message including a request for information from a user and initiates an initial chat setup and determines entry criteria for a collaborative messaging queue 404 associated with a chat session. In the embodiment, the entry criteria include an optimal queue length for filling with chat participants 408 to participate in the chat session to provide the information requested in the message during participant interactive collaboration 412. In block 406, application 105 queue management operations including adjusting the length of the collaborative messaging queue by expanding or decreasing the length of collaborative messaging queue 404 to fill with chat participants 408. In block 410, application 105 determines variable wait times for determining a period of time for which application 105 waits for participants to join collaborative messaging queue 404 before initiating the participant interactive collaboration 412.

Figure 5:
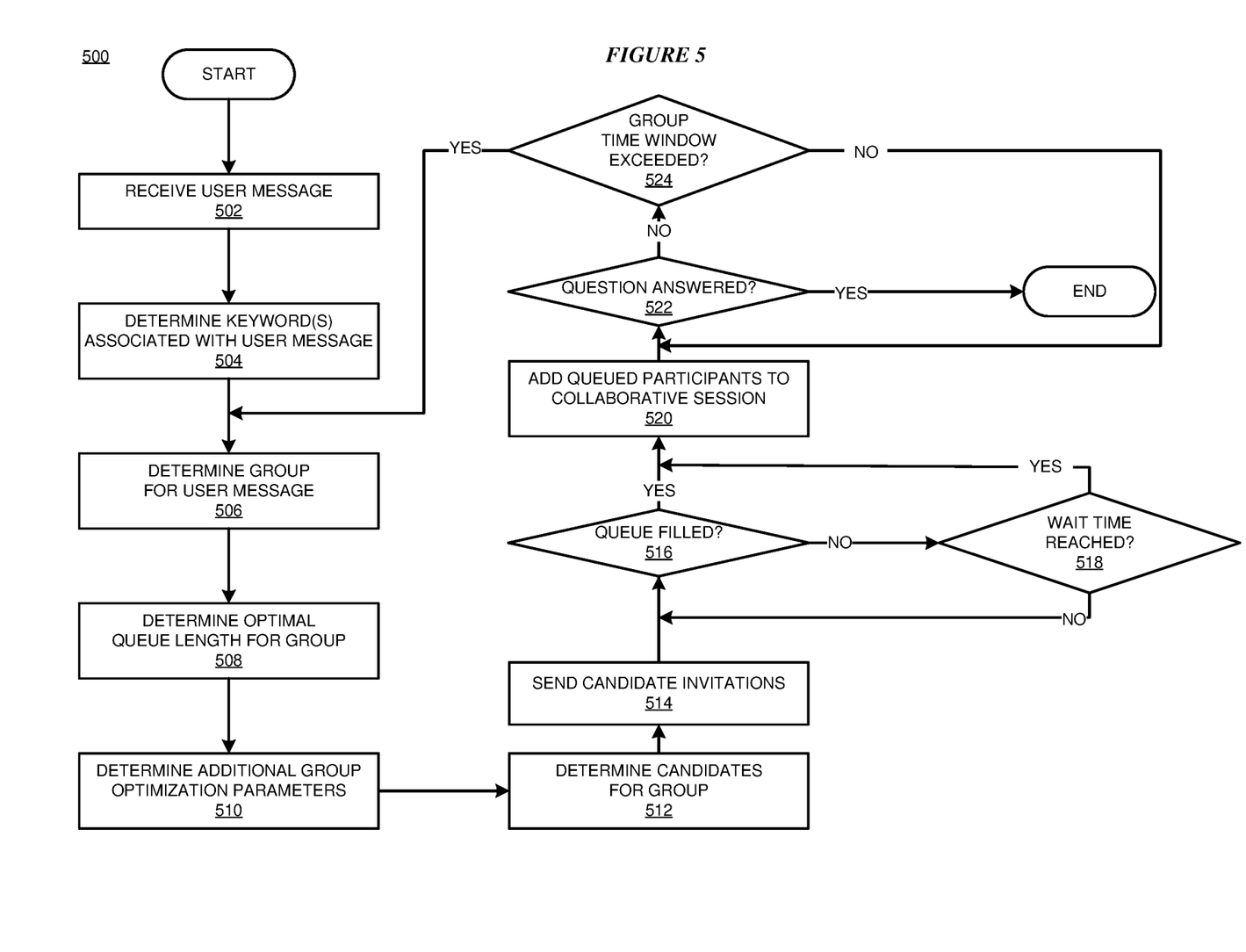
FIG. 5 depicts a flowchart of an example process for generating a user group using optimal messaging queue lengths for a collaborative messaging platform in accordance with an illustrative embodiment.

With reference to FIG. 5, this figure depicts a flowchart of an example process 500 for generating a user group using optimal messaging queue lengths for collaborative messaging platforms in accordance with an illustrative embodiment. In block 502, application 105 receives a user message from a user directed to a collaborative messaging platform including a request for information (e.g., a question) for which the user desires an answer. In block 504, application 105 determines one or more keywords associated with the user message from the user message. In particular embodiments, the one or more keywords are indicative of a topic or context of the user message. In particular embodiments, the system generates the associated keywords from the user message using one or more topic, context, and/or keyword determination techniques such as natural language processing (NLP).

In block 506, application 105 determines a group for the user message based upon the one or more keywords. In a particular embodiment, the group is a particular channel of the collaborative messaging platform associated with subject matter indicative of the one or more keywords. In block 508, application 105 determines an optimal queue length for the group including a number of candidates to participate in the group. In a particular embodiment, the optimal queue length for the group is determined based upon a statistical likelihood of success of the requested information being provided during the collaborative messaging session.

In block 510, application 105 determines one or more additional group optimization parameters for the group. In particular embodiments, the additional group optimization parameters may include one or more of a time window to wait for the queue to fill with participants and an indication of a condition in which group optimization stops. In particular embodiments, group optimization stops by one or more of the system automatically detecting the question as answered, relying on users to indicate that the question has been answered, polling the original message sender to answer whether the question has been answered, or when all possible candidates have been notified.

In block 512, application 105 determines one or more candidates for participation in the group. In an embodiment, application 105 determines the one or more candidates based upon a channel profile for each candidate. In an embodiment, the channel profile includes one or more of information indicating that the candidate has expertise in the subject matter or context indicated by the one or more keywords, information indicating how active the candidate is in the given channel, information indicating an amount of how much the candidate has assisted in the past in providing information associated with the subject matter associated with the keyword, information indicating that the candidate is active on the collaborative messaging platform in other channels of the collaborative messaging platform regarding subject matter associated with the keyword, and the information indicating general active time of the candidate on the collaborative messaging platform.

In block 514, application 105 sends invitations to the one or more selected candidates requesting participation in the group. In the embodiment, each participant may provide an indication to application 105 of whether the participant has accepted the invitation to participate in the collaborative messaging session. If the participant accepts the invitation, application 105 address the candidate to the queue. In block 516, application 105 determines whether the queue has been filled with a number of participants equal to the optimal queue length for the group. If the queue has not been filled to the optimal group length, in block 518 application 105 determines if a predetermined wait time has been reached. If the predetermined wait time has not been reached, process 500 returns to block 516. If the queue is filled or the wait time has been reached, process 500 continues to block 520.

In block 520, application 105 adds the queued participants including the selected candidates and the sender of the user message to a collaborative session in which the selected candidates may interact with one another to attempt to provide the information requested by the user message. In block 522, application 105 determines if the question presented in the user message has been answered. In a particular embodiment, application 105 or the collaborative messaging platform automatically detects the question as answered. In other particular embodiments, application 105 or the collaborative messaging platform receives an indication that the question has been answered from one or more of the participants, or an indication from the sender of the user message sender that the question has been answered. If the question has been answered, process 500 ends.

If the question has not been answered, in block 524 application 105 determines whether a group time window has been exceeded. If the group time window has not been exceeded, process 500 returns to block 522. If the group time window has been exceeded, process 500 returns to block 506 and application 105 determines a next group, optimal queue length, and candidates for the group until the question has been answered or all potential candidates have been notified.

Thus, a computer implemented method, system or apparatus, and computer program product are provided in the illustrative embodiments for cognitively generating user groups using optimal messaging queue lengths for collaborative messaging platforms and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving a user message containing a request for information;
   determining one or more keywords associated with the user message;
   hosting a collaborative messaging session, the hosting comprising:
      determining a group for the collaborative messaging session;
      determining a queue length for the group;
      selecting one or more candidates based on the one or more candidates being associated with the one or more keywords, a number of the one or more candidates being based upon the queue length;
      transmitting an invitation to each candidate to join the collaborative messaging session; and
      waiting a period of time for the one or more candidates to answer the request for information; and
   repeating, while the user request has not been answered, one or more additional iterations of the hosting of the collaborative messaging session, wherein the selecting includes selecting one or more next candidates.

2. The method of claim 1, further comprising:
   adding at least one of the one or more candidates to the collaborative messaging session.

3. The method of claim 2, further comprising:
   determining a wait time for the group; and
   determining that the wait time for the group has been exceeded, wherein the adding of the at least one of the one or more candidates to the collaborative messaging session is responsive to the wait time for the group being exceeded.

4. The method of claim 1, wherein the group is determined based upon the one or more keywords.

5. The method of claim 1, wherein the one or more candidates are determined based upon a profile of the candidate.

6. The method of claim 5, wherein the profile includes the one or more keywords being associated with a profile of the candidate.

7. The method of claim 6, wherein the profile further includes at least one of information indicating activity of the candidate in the group, information indicating an amount that the candidate has assisted previously in providing information associated with the one or more keywords, information indicating activity of the candidate in other groups associated with the one or more keywords, and information indicating general activity of the candidate on a collaborative messaging platform including the collaborative messaging session.

8. The method of claim 1, wherein the queue length is determined based upon a determined based upon a statistical likelihood of the requested information being provided during the collaborative messaging session.

9. A computer usable program product comprising one or more computer-readable storage devices, and program instructions stored on at least one of the one or more storage devices, the stored program instructions comprising:
   program instructions to receive a user message containing a request for information;
   program instructions to determine one or more keywords associated with the user message;
   program instructions to host a collaborative messaging session, the program instructions to host further comprising program instructions to:
      determine a group for the collaborative messaging session;
      determine a queue length for the group;
      select one or more candidates based on the one or more candidates being associated with the one or more keywords, a number of the one or more candidates being based upon the queue length;
      transmit an invitation to each candidate to join the collaborative messaging session; and
      wait a period of time for the one or more candidates to answer the request for information; and
   program instructions to repeat, while the user request has not been answered, one or more additional iterations of the hosting of the collaborative messaging session, wherein the program instructions to select include instructions to select one or more next candidates.

10. The computer usable program product of claim 9, further comprising:
    program instructions to add at least one of the one or more candidates to the collaborative messaging session.

11. The computer usable program product of claim 10, further comprising:
    program instructions to determine a wait time for the group; and
    program instructions to determine that the wait time for the group has been exceeded, wherein the adding of the at least one of the one or more candidates to the collaborative messaging session is responsive to the wait time for the group being exceeded.

12. The computer usable program product of claim 9, wherein the group is determined based upon the one or more keywords.

13. The computer usable program product of claim 9, wherein the one or more candidates are determined based upon a profile of the candidate.

14. The computer usable program product of claim 13, wherein the profile includes the one or more keywords being associated with a profile of the candidate.

15. The computer usable program product of claim 13, wherein the profile further includes at least one of information indicating activity of the candidate in the group, information indicating an amount that the candidate has assisted previously in providing information associated with the one or more keywords, information indicating activity of the candidate in other groups associated with the one or more keywords, and information indicating general activity of the candidate on a collaborative messaging platform including the collaborative messaging session.

16. The computer usable program product of claim 9, wherein the queue length is determined based upon a statistical likelihood of the requested information being provided during the collaborative messaging session.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive a user message containing a request for information;

program instructions to determine one or more keywords associated with the user message;

program instructions to host a collaborative messaging session, the program instructions to host further comprising program instructions to:

determine a group for the collaborative messaging session;

determine a queue length for the group;

select one or more candidates based on the one or more candidates being associated with the one or more keywords, a number of the one or more candidates being based upon the queue length;

transmit an invitation to each candidate to join the collaborative messaging session; and         wait a period of time for the one or more candidates to answer the request for information; and     program instructions to repeat, while the user request has not been answered, one or more additional iterations of the hosting of the collaborative messaging session, wherein the program instructions to select include instructions to select one or more next candidates.

20. The computer system of claim 19, the stored program instructions further comprising:

program instructions to add at least one of the one or more candidates to the collaborative messaging session.

* * * * *